(12) United States Patent
Chaiken et al.

(10) Patent No.: US 12,254,189 B2
(45) Date of Patent: Mar. 18, 2025

(54) SINGLE-BIT MEMORY ERROR DETECTION

(71) Applicant: DELL PRODUCTS L.P., Round Rock, TX (US)

(72) Inventors: Craig Chaiken, Pflugerville, TX (US); Shiven Pandya, Austin, TX (US); Paul Jimenez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 18/310,268

(22) Filed: May 1, 2023

(65) Prior Publication Data
US 2024/0370180 A1 Nov. 7, 2024

(51) Int. Cl.
*G06F 3/06* (2006.01)

(52) U.S. Cl.
CPC .......... *G06F 3/0619* (2013.01); *G06F 3/0638* (2013.01); *G06F 3/0679* (2013.01)

(58) Field of Classification Search
CPC ..... G06F 3/0619; G06F 3/0638; G06F 3/0679
See application file for complete search history.

(56) References Cited

U.S. PATENT DOCUMENTS

| | | | |
|---|---|---|---|
| 11,163,886 B2 | 11/2021 | Chaiken et al. | |
| 11,379,330 B2 | 7/2022 | Chaiken et al. | |
| 2003/0065899 A1* | 4/2003 | Gorobets | G06F 12/0246 711/E12.008 |
| 2005/0022065 A1* | 1/2005 | Dixon | G11C 29/848 714/42 |
| 2008/0147964 A1* | 6/2008 | Chow | G06F 21/34 711/E12.001 |
| 2015/0331623 A1* | 11/2015 | Dong | G06F 3/0619 714/710 |
| 2019/0332461 A1 | 10/2019 | Chaiken et al. | |
| 2022/0050858 A1* | 2/2022 | Karr | G06F 11/3466 |

* cited by examiner

*Primary Examiner* — Masud K Khan
(74) *Attorney, Agent, or Firm* — Larson Newman, LLP

(57) ABSTRACT

A system analyzes data associated with a failure of an information handling system by evaluating memory addresses found in memory, such as bug check parameters, context register values, or stacks in a memory dump, at the time of a fatal error to determine whether one of the memory addresses has a single-bit error, and modifying a first memory address with the single-bit error to generate a second memory address, wherein the first memory address is one of the memory addresses being evaluated. If a second memory address is mapped to the page table, the system authorizes a repair of the information handling system.

20 Claims, 10 Drawing Sheets

SINGLE-BIT MEMORY ERROR DETECTION

FIELD OF THE DISCLOSURE

The present disclosure generally relates to information handling systems, and more particularly relates to single-bit memory error detection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system analyzes data associated with a failure of an information handling system by evaluating memory addresses associated with bug check parameters included in the data to determine whether one of the memory addresses has a single-bit error, and modifying a first memory address with the single-bit error to generate a second memory address, wherein the first memory address is one of the memory addresses being evaluated. If a second memory address is mapped to the page table, the system authorizes a repair of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
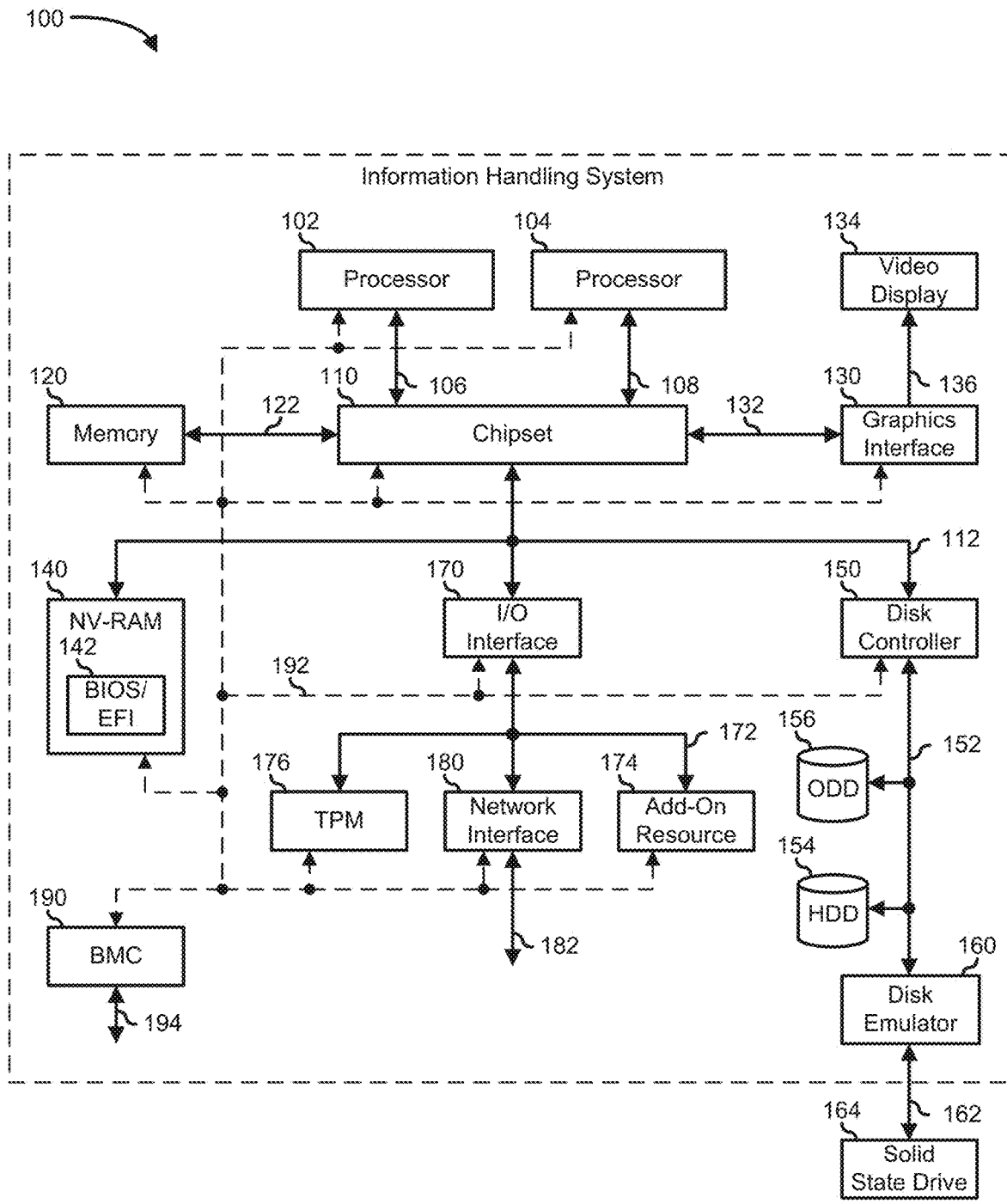
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device; a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an I²C bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Bad memory is a leading cause of fatal errors (also referred to as a stop error, a blue screen of death (BSOD), or a catastrophic error) in information handling systems. Even when a memory passes a test, technical support technicians will often replace the memory. As a result, approximately seventy-five percent of all memory modules, such as DIMMs or similar which are replaced as bad, are in fact fine. Thus, there is a need to better determine which information handling systems truly need a replacement memory module.

Figure 2:
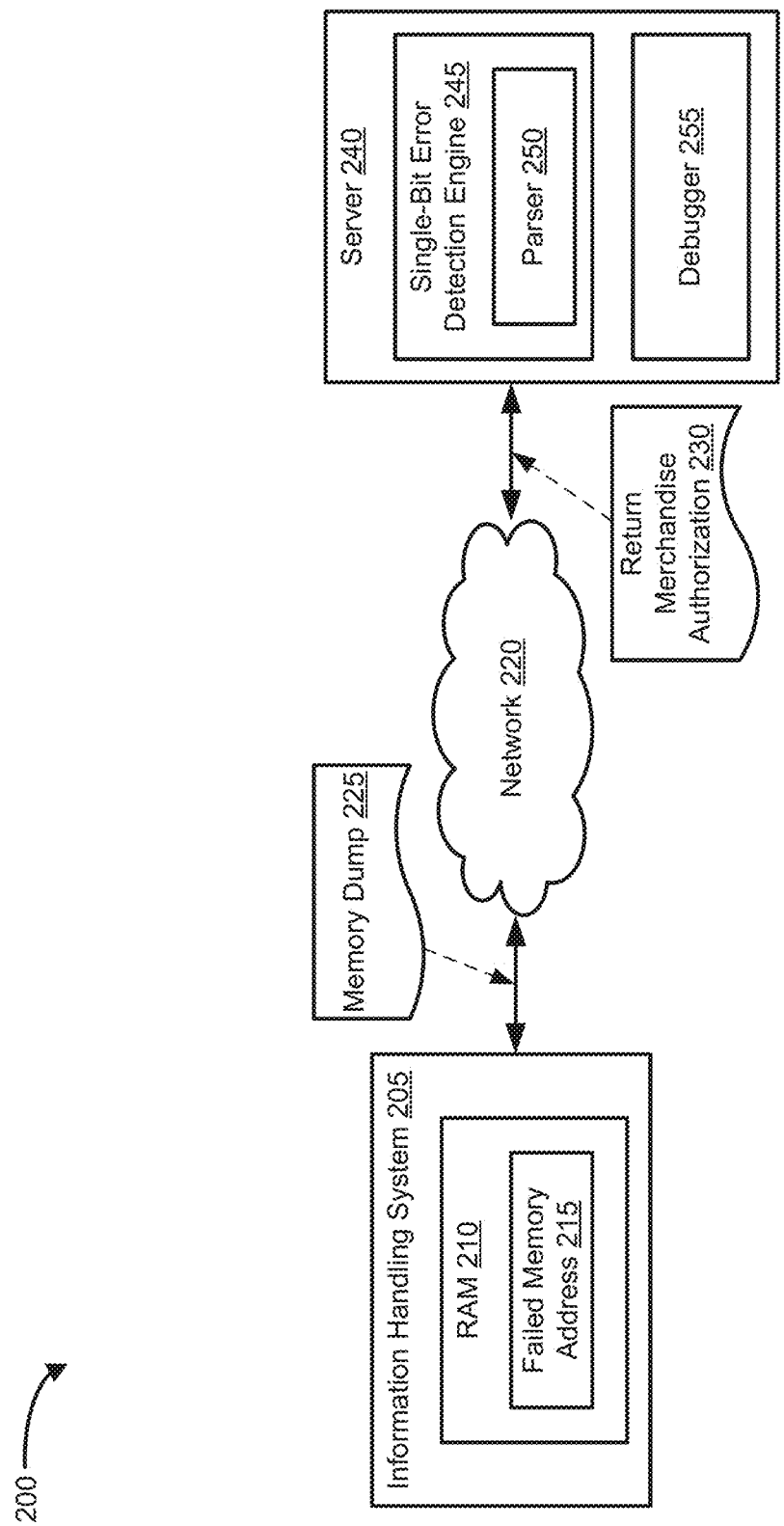
FIG. 2 is a block diagram illustrating an environment for single-bit memory error detection, according to an embodiment of the present disclosure.

FIG. 2 shows an environment 200 for single-bit memory error detection. Environment 200 includes an information handling system 205, a network 220, and a server 240. Information handling system 205, which is similar to information handling system 100 of FIG. 1, includes an RAM 210 with a failed memory address 215. Information handling system 205 includes an RAM 210, which is similar to memory 120 or NV-RAM 140 of FIG. 1, and a failed memory address 215. Server 240 includes a single-bit error detection engine 245 and a debugger 255. Single-bit error detection engine 245 includes a parser 250.

When a user reports a full system failure to a manufacturer more than once, the manufacturer may request the user to get a memory dump, such as memory dump 225. Memory dump may be analyzed locally or using a remote server like server 240 via debugger 255. Debugger 255 is a computer program, such as a Microsoft Windbg™ or a kernel debugger script, that is used to test and debug other programs. Memory dump 225 may be uploaded from information handling system 205 to server 240 via network 220. In certain embodiments, network 220 may be a public network, such as the Internet, a physical private network, a wireless network, a virtual private network, or any combination thereof. The analysis may be performed to determine if the failure was caused by a single-bit memory error, also referred to as a single-bit error. The single-bit error may refer to a memory address with a single-bit that is damaged, such as failed memory address 215. In this example, single-bit error detection engine 245 may be configured to detect failed memory address 215. Although RAM 210 in this example includes a failed memory address, in another embodiment, RAM 210 may not have a failed memory address.

Prior to performing the analysis, a 64-bit memory value input may be verified to be a memory address. A 64-bit memory value may not be a memory address if one or both of the following is true: a) values of bits 47 through 32 are all 1's and/or b) the 64-bit value is not consistent with a bitmask. For example, upper and lower 32 bits have 30 or more set bits, or all lower 32 bits are clear. A 64-bit memory address may be damaged if one or both of the following is true: a) upper 16 bits include 15 set bits instead of 16 set bits and/or b) toggling a value of a single-bit in the 64-bit address may make the 64-bit address correspond to a memory address that is mapped to a page table. However, not toggling the value of the single-bit makes the 64-bit address does not correspond to an address that is mapped to a page table. If a damaged 64-bit address is found, such that toggling the value of the single-bit results in the memory address being mapped to a page table, a single-bit error may have occurred in the failing operating system thread and the user may be provided with authorization for repair. For example, the user may be provided with a quick response (QR) code or a return to manufacturer authorization (RMA) number, such as RMA 230. The QR code or the RMA number may be associated with a service tag or serial number in the memory dump file. The generation of the QR code or the RMA number may trigger a part replacement.

Memory dump 225 may provide information about the last state of the programs, applications, hardware, firmware, and the like of information handling system 205 before they are terminated and/or crashed. Memory dump 225 includes information associated with memory locations, program counters, program state, and other related details. This information can be displayed on-screen and can also be stored in a system log file for later viewing and/or referencing. After a memory dump, a computing system is generally unavailable or inaccessible until it is booted.

Single-bit error detection engine 245 may use parser 250 to read memory values associated with bug check parameters, CPU context registers, and stack memory included in memory dump 225. The memory values are read from the aforementioned places one by one. Single-bit error detection engine 245 may be configured to accept two memory values at a time as input. Single-bit error detection engine 245 may verify the validity that the 64-bit memory values are memory addresses and not data values prior to further processing. Accordingly, data values may not be processed further. There may be checks to determine if a 64-bit memory value, also referred to herein simply as memory value, is consistent with the attributes of a 64-bit memory address, also simply referred to herein as a memory address. First, the most significant 16 bits have at least 15 ones. Second, the most significant 32-bits should not be all 1's. This filter out the memory values that look like a memory address but are acting as a data mask. And third, the lowest significant 32-bits should not be all zeros. This filter out the memory addresses which are 64-bits in length but are used as 32-bit. After determining that the memory value is consistent with attributes of a 64-bit memory address, single-bit error detection engine 245 may check for the single-bit error.

The process of single-bit error detection may be divided into two parts. For the first part, single-bit error detection engine 245 may check if a pair of input memory addresses are the same. If the pair memory addresses are the same, then check whether the memory addresses include all 1's in its most significant 16 bits, which is the 63rd bit to the 48th bit for the 64-bit system. If the most significant 16 bits have a single bit that is not one, such as a zero, then the memory address may be damaged. This is because it is expected to have all 1's in the most significant 16 bits. Else, if the most significant 16 bits have more than one bit that is not one, then that memory address may be ignored, and the processing ends for the current pair of memory addresses. The process may then continue to compare another pair of memory addresses. For example, a first memory address is equal to 7fff968427e9f9c8, and a second memory address is equal to 7fff968427e9f9c8. In this example, the values of the first memory address and the second memory address are the same. The 16 most significant bits which are "7fff" are then compared to all 1's, in binary form, which is "ffff" in hexadecimal. In this example, there is a single-bit difference between 7fff and ffff, thus the memory address may have a single-bit error and may be deemed a damaged address.

If the memory address may have been deemed as a damaged address, then the bad bit which is the bit that is not one may be flipped to generate a new memory address. For example, if the bit has a zero, then the bit may be flipped to have a value of one. This may be performed to confirm the single-bit error. For example, if flipping the single-bit generates a valid memory address, then the memory address deemed damaged may have a single-bit error. Otherwise, the memory address may not have a single-bit error. The generated memory address may be valid if a debugging tool, such as debugger 255, can read it. The generated memory address can be read if the generated memory address is mapped to a page table.

For the second part, if the pair of memory addresses are not the same, then a score may be used to determine the likelihood of one of the memory addresses having a single-bit error. The scoring process may be used to detect damaged memory addresses, wherein the higher the score, the higher the likelihood that one of the memory addresses has a single-bit error. To determine the score, the process may convert the memory addresses into a hexadecimal format with a length of sixteen characters for each memory address. Single-bit error detection engine 245 may then go through each of the sixteen characters of one of the memory addresses, referred to as a first memory address.

The process may compare a character of the first memory address to another character of a second memory address. The character at the second memory address is located at the same character index as the character at the first memory address. If the first character and the second character are different, the process may compare numeric values of these hexadecimal characters and determine if there is a single-bit difference between the two. If there are more than one pair of characters with a single-bit difference, then the process ends. Another pair of memory addresses may be processed instead.

A character with a single-bit difference from a reference may also be referred to as a bad character. If there is a pair of characters with a single-bit difference, then a value for the score may be determined. For example, the score may be set to a value of sixteen less than the value of an index of the bad character. This is because the value of a character at a first index is zero, whereas, in hexadecimal values, a first character of a hexadecimal string is a $16^{th}$ nibble for a 64-bit system. So, the value of the score is determined according to the hexadecimal nibble value. When single-bit error detection engine 245 identifies the bad character, the process counts the hexadecimal characters that are the same in both memory addresses after the current bad character. The process may add the count to the current value of the score by first dividing the count by 100. For example, a first memory address may have a value of ffff802088399e0 and a second memory address may have a value of ffffa02088114e0. In this example, the $6^{th}$ hexadecimal characters have a single-bit difference, as underlined. The characters with the single-bit difference are both followed by the same characters. Thus, this pair of memory addresses may get a score of 11, which is 16 less 5.

The first character in the hexadecimal string, which is also the character in the $0^{th}$ index is the most significant nibble of the value of the memory address. A bad character in the $0^{th}$ index may provide a score of 16 or higher. Thus, the higher score may indicate that a more significant nibble is damaged. The score may be increased by the number of the same hexadecimal characters shared by both memory addresses after the damaged nibble. If the pair of memory addresses are similar when read from the most significant bit to the lowest significant bit, the likelihood of the memory addresses sharing the same memory region is high. If one of the memory addresses is similar and is a single bit away from the other address, then one of the memory addresses may be a damaged address.

In one example, given a first memory address with a value ffff802088399e0 and a second memory address with a value ffffa02088314e0, note that the first memory address is similar to the second memory address, as a number of characters at different index locations are the same. Thus, the first memory address and the second memory address may be pointing to the same memory region. In this example, the $6^{th}$ hexadecimal character in the first memory address is different than the $6^{th}$ hexadecimal character in the second memory address. Thus, one of the memory addresses may be a damaged address. In another example, given a first memory address with a value ffff802088399e0 and a second memory address with a value fff968427e9f9c8, note that the first memory address is not similar to the second memory address, as a number of characters at different index locations are not the same.

A memory address suspected to be damaged can be confirmed to have a single-bit error by attempting to read the memory address using a tool such as debugger 255. If reading the memory address fails, then the memory address can be suspected as a damaged memory address. A new memory address is generated from the suspected damaged address by flipping a bad bit. The bad bit is the bit with a single-bit difference. An attempt to read the generated memory address is performed. If the generated memory address can be read, then it may be confirmed that the suspected damaged memory address has a single-bit error. An information handling system may have a bad memory if the memory dump includes at least one memory address with a confirmed single-bit error.

To reduce false positives, the memory address with a bad character that is followed by at least four hexadecimal digits that are the same may be considered a damaged memory address. Otherwise, the memory address with a bad character that is not followed by at least the same four hexadecimal digits may not be considered a damaged memory address. In addition, the count of the same hexadecimal digits can only have a number of zeros as a hexadecimal character/nibble at most half of the count value less one.

Those of ordinary skill in the art will appreciate that the configuration, hardware, and/or software components of environment 200 depicted in FIG. 2 may vary. For example, the illustrative components within environment 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
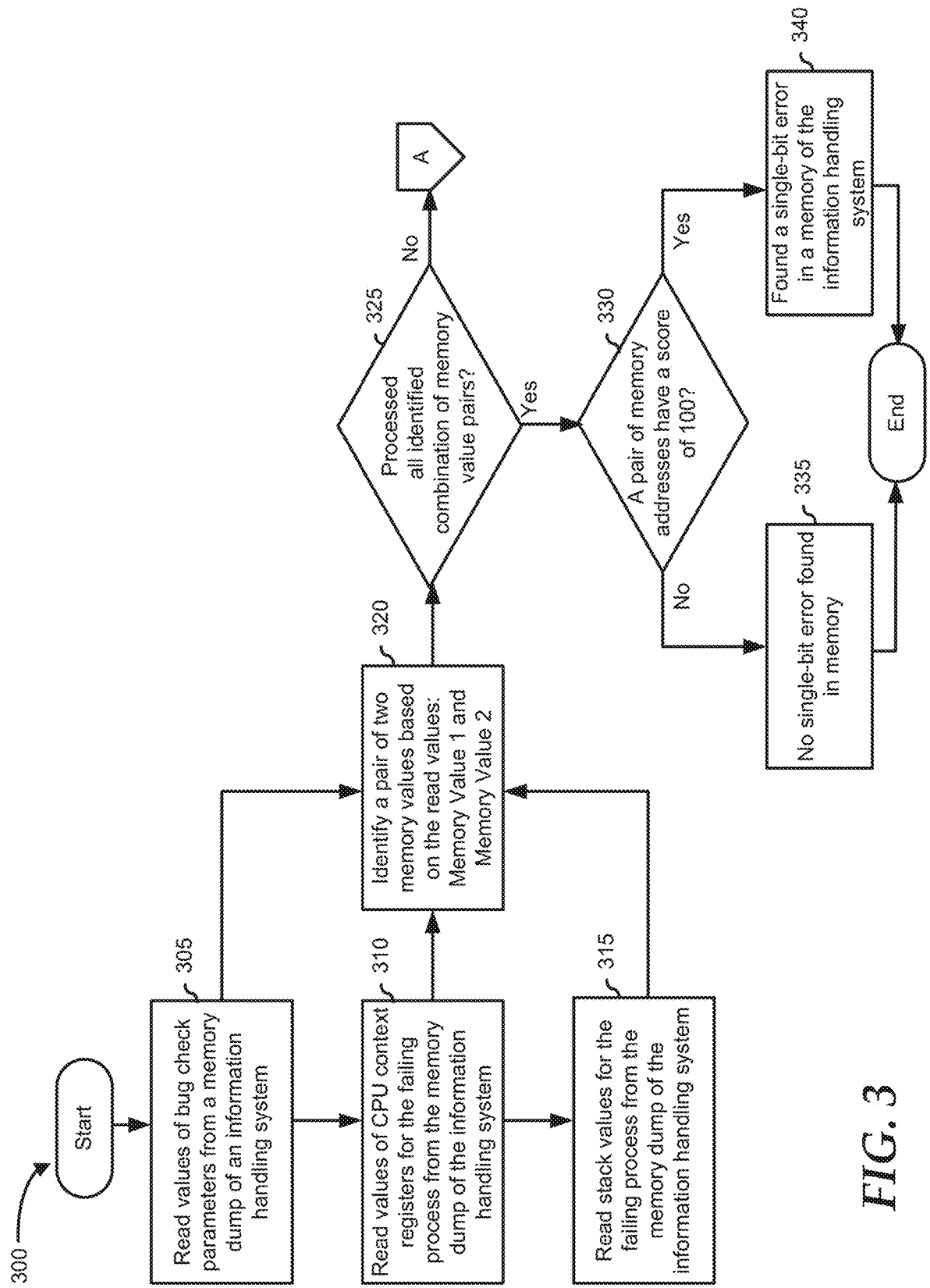
FIG. 3 is a flowchart illustrating a method for single-bit memory error detection, according to an embodiment of the present disclosure.

FIG. 3 shows a flowchart of a method 300 for single-bit error detection. Method 300 typically starts at block 305 where a single-bit detection engine may read bug check parameters from a memory dump. The memory dump may be associated with an information handling system that had a fatal error more than once. The method may proceed to block 320 and block 310 where the single-bit detection engine may read CPU context registers for the failing process from the memory dump. The method may proceed to block 320 and block 315, where the single-bit detection engine may read stack values for the failing process from the memory dump.

At block 320, the method may compare each of the memory values parsed or read from the memory dump may be compared against every other memory value parsed or read. The method may look for similar values during the comparison in which of the nibbles are the same, but one nibble includes a toggled bit or a single-bit difference between the two memory values. The method may identify a pair of two memory values: memory value_1 and memory value_2. The method may proceed to decision block 325 where the single-bit detection engine may determine whether all identified combinations of memory value pairs have been processed. If not all of the identified combination of memory value pairs has been processed, then the "NO" branch is taken, and the method proceeds to block 405 and block 410 of method 400 of FIG. 4. If all of the identified combinations of memory value pairs have been processed, then the "YES" branch is taken, and the method proceeds to decision block 330.

At decision block 330, the single-bit detection engine determines whether there is a pair of memory addresses that have a score of 100. If a pair of memory addresses have a score of 100, then the "YES" branch is taken, and the method proceeds to block 340. If there is no pair of memory addresses that has a score of 100, then the "NO" branch is taken, and the method proceeds to block 335. At block 340, the single-bit detection engine found a single-bit error in the memory of the information handling system. At block 335, the single-bit detection engine has not found a single-bit error in the memory of the information handling system. After reaching block 340 or block 335, the method ends.

Figure 4:
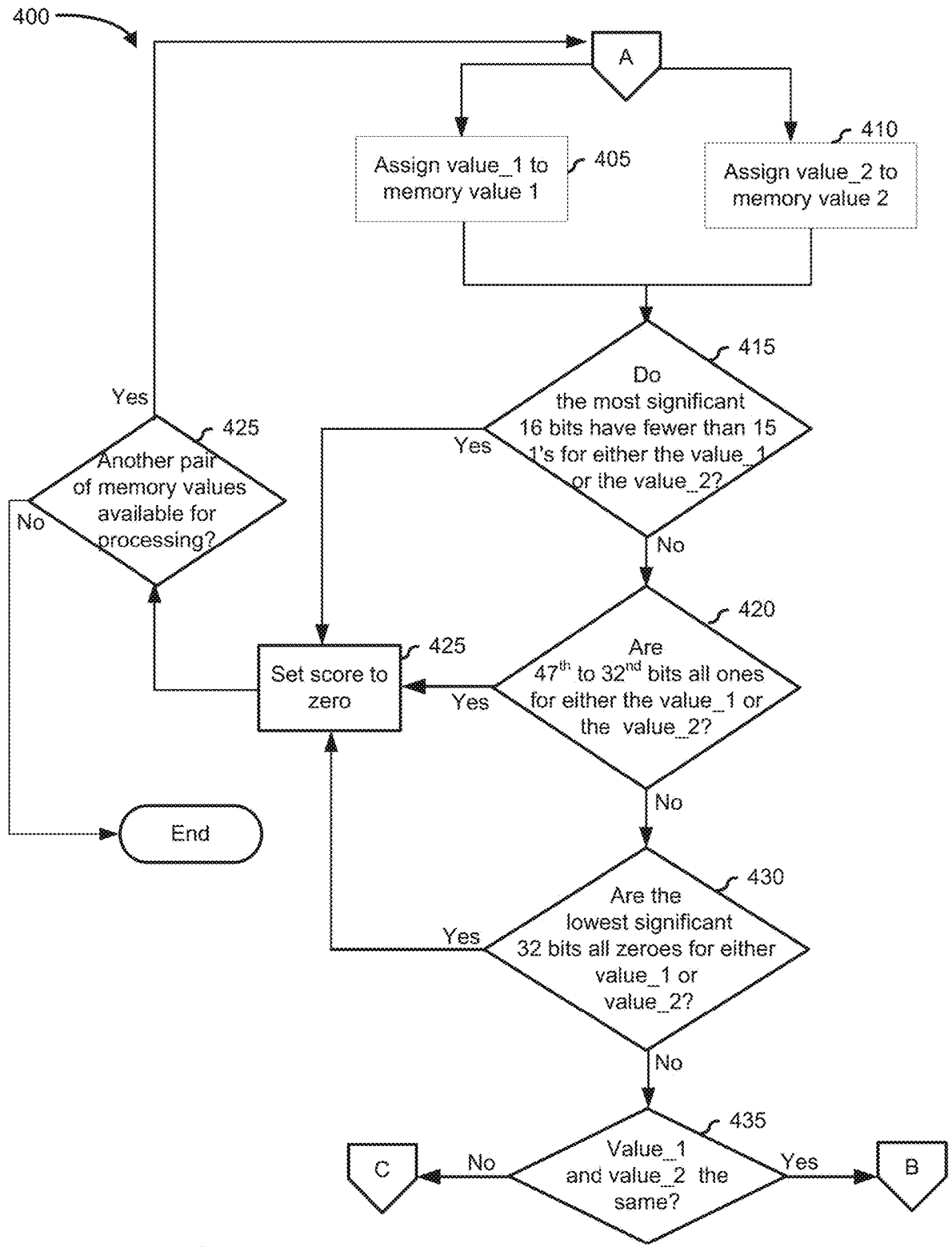
FIG. 4 is a flowchart illustrating a method for single-bit memory error detection, according to an embodiment of the present disclosure.

FIG. 4 shows a flowchart of a method 400 for single-bit memory error detection. Method 400 is a continuation of method 300 of FIG. 3. Method 400 may perform several checks to determine if the memory values in a pair are valid addresses or not, as these memory values can also be data values, pointer values, etc. If the memory values fail with one of the checks, the method gives that pair of memory values a score of zero and the method retrieves a new pair of memory values. Otherwise, the method proceeds to continue to method 500 of FIG. 5.

The single-bit detection engine may start processing the pair of memory value_1 and memory value_2. At block 405, a "value_1" is assigned to the parameter memory value_1. At block 410, a "value_2" is assigned parameter memory value_2. Subsequently, the single-bit error engine may perform three checks at decision block 415, decision block 420, and decision block 430. At decision block 415, the single-bit detection engine may decide whether the most significant 16 bits have fewer than fifteen 1's for either the value 1 or the value 2. If the most significant 16 bits have fewer than 15 1's for either the value_1 or the value_2, then the "YES" branch is taken, and the method proceeds to block 425. If the most significant 16 bits do not have fewer than 15 1's for the value_1 or the value_2, then the "NO" branch is taken, and the method proceeds to decision block 420.

At decision block 420, the single-bit detection engine may determine whether the $47^{th}$ to $32^{nd}$ bits are all 1's for either the value_1 or the value_2. If the $47^{th}$ to $32^{nd}$ bits are all 1's for either the value_1 or the value_2, then the "YES" branch is taken, and the method proceeds to block 425. If the $47^{th}$ to $32^{nd}$ bits are not all 1's for either the value 1 or the value_2, then the "NO" branch is taken, and the method proceeds to decision block 430. At decision block 430, the method determines whether the lowest significant 32 bits are all 0's for either the value 1 or the value_2. If the lowest significant 32 bits are all 0's for either the value_1 or the value_2, then the "YES" branch is taken, and the method proceeds to block 425.

If the lowest significant 32 bits are not all 0's for either the value_1 or the value_2, then the "NO" branch is taken, and the method proceeds to decision block 435. At block 425, the single-bit detection engine sets a score to zero and the method proceeds to decision block 425 where it determines whether there is another pair of memory values available for processing. If there is another pair of memory values available for processing, then the "YES" branch is taken, and the method proceeds to block 405 and block 410. If there is no other pair of memory values available for processing, then the "NO" branch is taken, and the method ends. At decision block 435, the method may determine whether the value_1 is the same as the value_2. If the value_1 is the same as the value_2, then the method proceeds to decision block 505 of FIG. 5. If the value_1 is not the same as the value_2, then the method proceeds to block 605 of FIG. 6.

Figure 5:
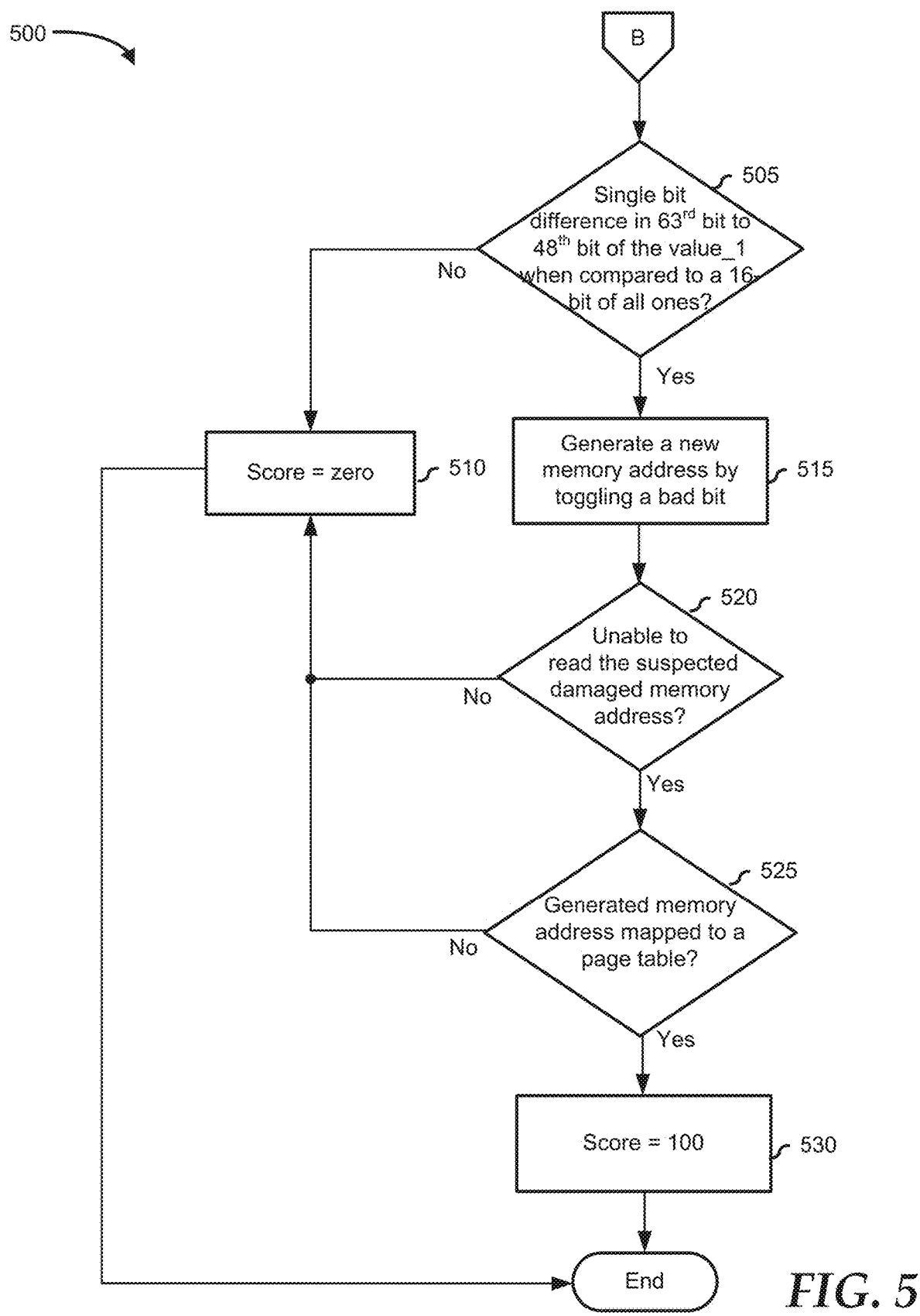
FIG. 5 is a flowchart illustrating a method for single-bit memory error detection, according to an embodiment of the present disclosure.

FIG. 5 shows a flowchart of a method 500 for single-bit error detection. Method 500 is a continuation of method 400 of FIG. 4. Method 500 may have been invoked when it was determined at method 400 of FIG. 4 that the pair of memory addresses looks like valid memory addresses and have the same values. Because if both memory addresses are the same, then there may not be a single-bit difference between the two. Instead, the method may check if there is a single-bit difference in first four nibbles/hexadecimal characters when compared to expected values for those first four nibbles/hexadecimal characters. For example, the first four nibbles/hexadecimal characters will be compared to "FFFF" or 16 ones in binary. If there is a bit that is different from the expected values, then the memory address may be deemed as a suspected damaged memory address and reading a memory value associated with the suspected damaged memory address may not be possible. In addition, if the suspected damaged memory address is modified or a new memory address is generated by toggling the single bit that was different, then the memory value associated with the suspected damaged address may be read. If the memory value associated with the suspected damaged memory address cannot be read, but if the memory value can be read after toggling the single bit that is different, then the method may consider the suspected damaged memory address has a single-bit error and assigns a score of 100. Otherwise, it is deemed that the suspected damaged memory address is not damaged.

At decision block 505, the single-bit detection engine may determine whether there is a single-bit difference in one of bits from $63^{rd}$ bit to $48^{th}$ bit of the value_1 when compared to 16 bits of all 1's. If there is a single-bit difference in the 63"d bit to the $48^{th}$ bit, then the "YES" branch is taken, and the method proceeds to block 515. If there is no single-bit difference in the $63^{rd}$ bit to the $48^{th}$ bit, then the "NO" branch is taken, and the method proceeds to block 510. At block 510, the method may set the score to zero. At block 515, the method may generate a new memory address by toggling the bit with the single-bit different, also referred to as a bad bit. The current memory address being processed with a single-bit difference in the $63^{rd}$ bit to $48^{th}$ bit of the value_1 when compared to 16 bits of all 1's, may be identified as a suspected bad memory address. Prior to generating the new memory address, determining that the suspected bad memory address is not mapped to a page table. The method proceeds to decision block 520.

At decision block 520, the method may determine whether it is unable to read the suspected damaged address in the memory dump. If the method is unable to read the suspected damaged address, then the "YES" branch is taken, and the method proceeds to decision block 525. If the method can read the suspected damaged address, then the "NO" branch is taken, and the method proceeds to block 510. At decision block 525, the method may determine whether reading the new memory address returns a valid memory value. The memory address may return a valid memory value when the memory address is mapped to a physical memory address in a page table. If reading the new memory address returns a valid memory value, then the "YES" branch is taken, and the method proceeds to block 530. If reading the new memory address does not return a valid memory value, then the "NO" branch is taken, and the method proceeds to block 510. At block 530, the method may set the score to 100. After setting the score to zero or 100, the method ends.

Figure 6:
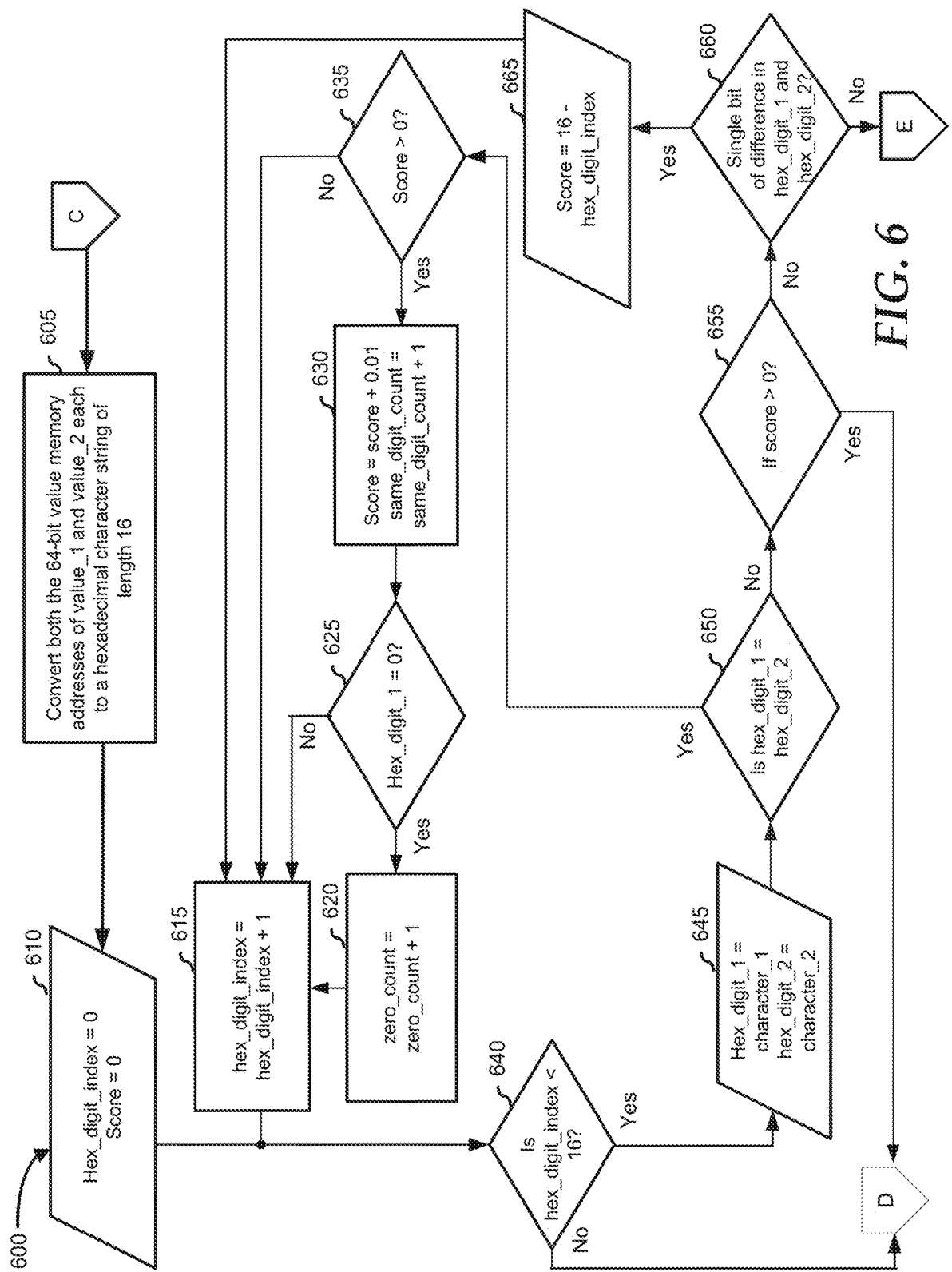
FIG. 6 is a flowchart illustrating a method for single-bit memory error detection, according to an embodiment of the present disclosure.

FIG. 6 shows method 600 for single-bit error detection. Method 600 is a continuation of method 400 of FIG. 4. Method 600 may be executed when a pair memory values processed in FIG. 4 looks like valid memory addresses and both memory addresses are not the same. Method 600 determines a score for the pair of memory addresses, wherein if the score may be used to identify whether one of the memory addresses has a single-bit error. For example, a score of 100 may be given to the memory address with a single-bit error.

Method 600 may compare each character of the memory address to determine if there is a single-bit difference and a score calculated. The higher the score, the greater the likelihood that there is a single-bit error in a memory address. Method 600 typically starts at block 605 where the single-bit detection engine may convert both the 64-bit value memory addresses value_1 and value_2 each to a hexadecimal character string of length 16. The method may proceed to block 610 where the method may set a hexadecimal string index (hex_string_index) to zero and the score to zero. The hexadecimal string index identifies the index of the character of the hexadecimal character string that is currently processed.

The method may proceed to decision block 640 where the single-bit detection engine may determine whether a hexadecimal digit index (hex_digit_index) is fewer than 16. At this point, the method may determine whether all of the characters in the hexadecimal character strings have been processed. If the hexadecimal digit index is fewer than 16, then the method proceeds to block 645 where the method may set a first parameter, hexadecimal digit one (hex_digit_1) to a character at the hexadecimal digit index value of the memory address of value 1. The method may also set a second parameter, hexadecimal digit two (hex_digit_2) to a second character at the hexadecimal digit index value of the memory address of value_2. The method proceeds to decision block 650 where the single-bit detection engine may determine whether a value of the hexadecimal digit one parameter is equal to a value of the hexadecimal digit two parameter. If the hexadecimal digit one value is equal to the hexadecimal digit two value, then the "YES" branch is taken, and the method proceeds to decision block 635. If the hexadecimal digit one value is not equal to the hexadecimal digit two value, then the "NO" branch is taken, and the method proceeds to decision block 655.

At decision block 635, the single-bit detection engine may determine whether the score is greater than zero. If the score is greater than zero, then the "YES" branch is taken, and the method proceeds to block 630. If the score is not greater than zero, then the "NO" branch is taken, and the method proceeds to block 615. At block 630, the method increments the score by setting the score to a current value of the score plus 0.01. The value 0.01 may be used to keep track of the value of the same digit counter (same_digit_count). For example, if the score has a value of 11.05, then it is implied that the same digit count is 5. Similarly, if the score has a value of 11.10, then it is implied that the same digit count is 10. The method may also increment a same-digit counter by one. The method proceeds to decision block 625 where the method determines whether the value of the hexadecimal digit one is equal to zero. If the value of the hexadecimal digit one is equal to zero, then the "YES" branch is taken, and the method proceeds to block 620. If the value of the hexadecimal digit one is not equal to zero, then the "NO" branch is taken, and the method proceeds to block 615. At block 615, single-bit detection code may increment the hexadecimal digit index by one.

At decision block 655, the method may determine whether the score is greater than zero. If the score is greater than zero, then the "YES" branch is taken, and the method proceeds to block 705 of FIG. 7. If the score is not greater than zero, then the "NO" branch is taken, and the method proceeds to decision block 660. At decision block 660, the method determines whether there is a single-bit difference between hexadecimal digit one value and a hexadecimal digit two value. If there is a single-bit difference between the hexadecimal digit one value and the hexadecimal digit two value, then the "YES" branch is taken, then the method proceeds to block 665. If there is no single-bit difference between the hexadecimal digit one value and the hexadecimal digit two value, then the "NO" branch is taken, then the method proceeds to block 705 of FIG. 7. At block 665, the score is set to 16 less a value of the hexadecimal digit index.

Figure 7:
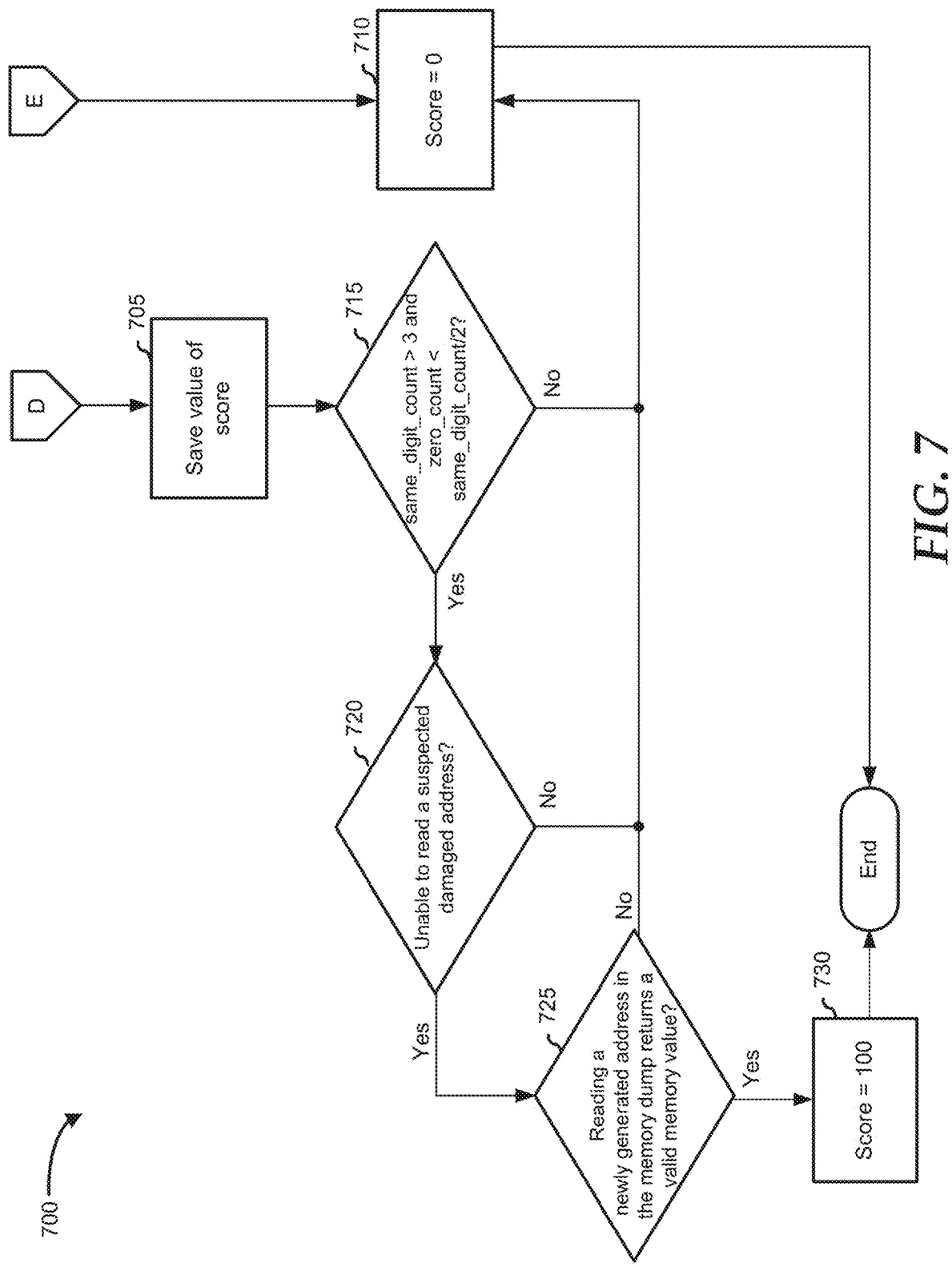
FIG. 7 is a flowchart illustrating a method for single-bit memory error detection, according to an embodiment of the present disclosure.

FIG. 7 shows a flowchart of a method 700 for single-bit error detection. Method 700 is a continuation of method 600 of FIG. 6. Method 700 typically starts at block 705 where the single-bit detection engine saves the value of the score from method 600 of FIG. 6 or method 800 of FIG. 8 in a non-volatile memory, a database, a file, or similar. The method proceeds to decision block 715, where the single-bit detection engine may determine whether a value of the parameter same digit counter (same_digit_count) is greater than three and a value of the parameter zero counter (zero_count) is fewer than the value of the same digit counter divided by two. The same digit counter may be used to count how many characters after the bad character are same in both the hexadecimal strings. The zero counter may be used to identify how many zeros are in the same digit counter.

If the value of the same digit counter is greater than three and the value of the zero counter is fewer than the value of the same digit counter divided by two, then the "YES" branch is taken, and the method proceeds to decision block 720. If the value of the same digit counter is not greater than three or the value of the zero counter is not fewer than the value of the same digit counter divided by two, then the "NO" branch is taken, and the method proceeds to block 710 where the value of the parameter score is set to zero. At decision block 720, the single-bit detection engine may determine whether it is unable to read the suspected damaged address. The single-bit detection engine may use a debugger to read the suspected damaged address. If the single-bit detection engine determines that it is unable to read the suspected damaged address, then the "YES" branch is taken, and the method proceeds to decision block 725. If the single-bit detection engine determines that can read the damaged address, then the "NO" branch is taken, and the method proceeds to block 710.

At decision block 725, the single-bit detection engine may determine whether reading a generated memory address in the memory dump returns a valid memory value. If reading the generated memory address returns a valid memory value, then the "YES" branch is taken, and the method proceeds to block 730. If reading the generated memory address does not return a valid memory value, then the "NO" branch is taken, and the method proceeds to block 710. At block 730, the value of the parameter score is set to 100. After block 710 or block 730, the method ends. A report may be generated by the single-bit detection engine that includes the value of the score. If the score is 100, then the single-bit error detection engine may have verified/confirmed that the suspected memory address is damaged and an RMA or QR code may be generated to authorize repair. If the score is zero, then the single-bit detection engine has not verified/confirmed that the suspected memory address is damaged. In this scenario, an RMA or QR code may not be generated. However, other processes may automatically be initiated or a technical support specialist may initiate the other processes to determine the issue.

Figure 8:
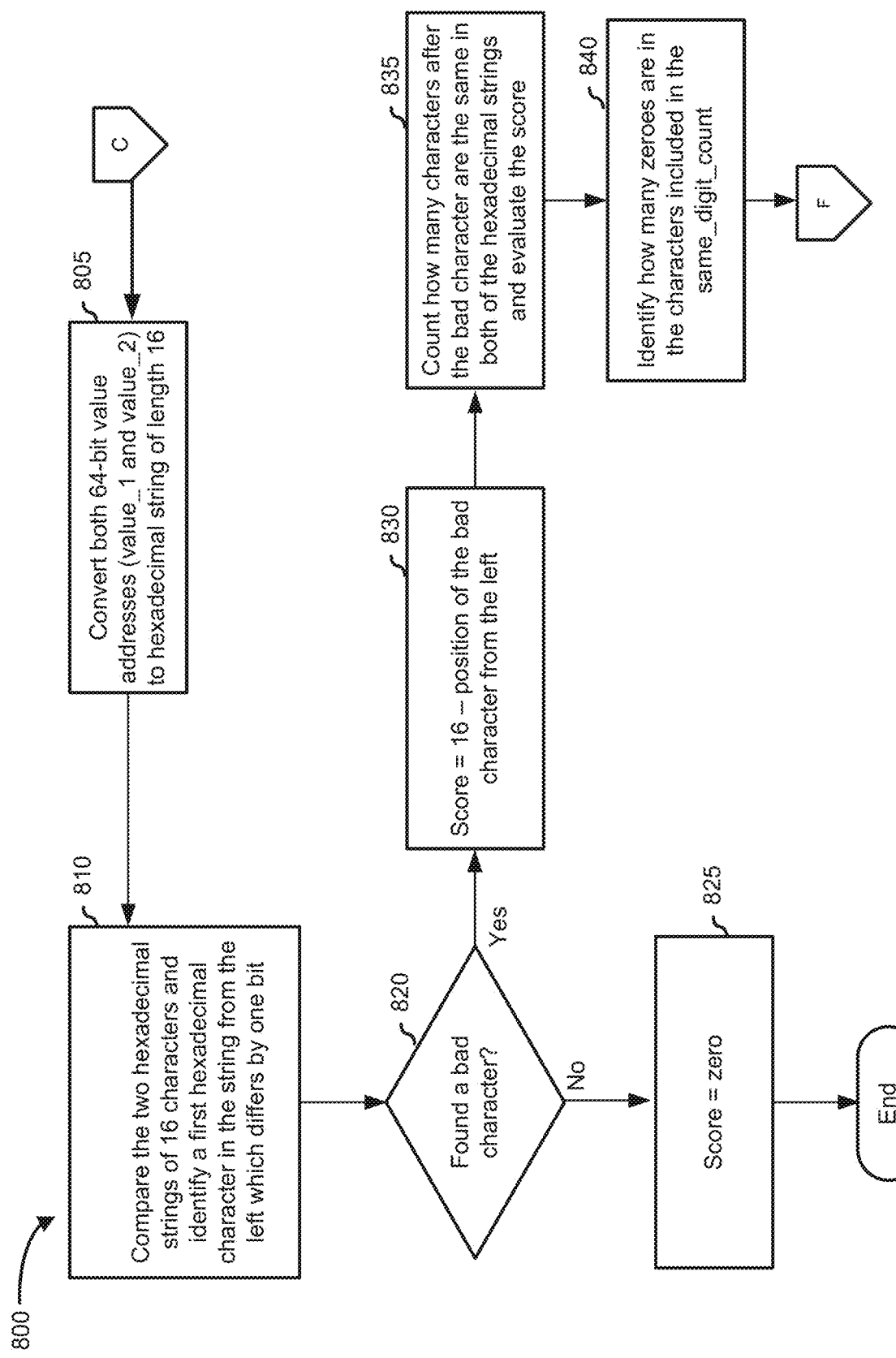
FIG. 8 is a flowchart illustrating a method for single-bit memory error detection, according to an embodiment of the present disclosure.

FIG. 8 shows a flowchart of a method 800 for single-bit error detection. Method 800 is another embodiment of method 600 of FIG. 6. Method 600 may be executed when a pair memory values processed in FIG. 4 looks like valid memory addresses and both memory addresses are not the same. Method 800 determines a score for the pair of memory addresses, wherein the score may be used to identify whether one of the memory addresses has a single-bit error.

Method 800 typically starts at block 805 where the single-bit detection engine may convert both 64-bit value memory addresses, referred to herein as value_1 and value_2 for ease of reference, to a hexadecimal string of 16 characters in length each. The method proceeds to block 810 where it may compare each of the characters of the two hexadecimal strings of 16 characters from the left. The single-bit detection engine may identify a hexadecimal character that differs by one bit from the character it is being compared to. This character may be simply referred to as a bad character. For example, given a first memory address with a value of ffff802088399e0 and a second memory address with a value of ffffa02088114e0, the single-bit detection engine may determine that the 6<sup>th</sup> hexadecimal character for each memory address differs by a single bit. Here, "8" is identified for the first memory address and "a" for the second memory address. Because hexadecimal values "8" and "a" differs by a single bit, in their binary values, such as 1000 versus 1010 respectively.

The method proceeds to block 820 where it may determine whether a bad character is found during the comparison. If a bad character is found, then the "YES" branch is taken, and the method proceeds to block 830. If a bad character is not found, then the "NO" branch is taken, and the method proceeds to block 825 where the method may set a value of a variable score to zero. Afterwards, the method ends.

At block 830, the single-bit detection engine may set the value of the score to 16 less a position of the bad character from the left. In this example, the bad characters "8" and "a" are the 6<sup>th</sup> hexadecimal character, so the hexadecimal digit index (hex_digit_index) is five. Thus, score may be evaluated to be 11, which is sixteen less five. The method may proceed to block 835 where it may count how many characters after the bad character are the same in both of the hexadecimal strings. This count may simply be referred to herein as same_digit_count. In this example, in both memory addresses, the bad characters are followed by the same five characters "02088". So, the value of same_digit_count is equal to five. At this point, the score may also be evaluated. In this example, the value of score may be equal to current value of score+ (same_digit_count*0.01), which is 11+(5*0.01)=11.05.

The method proceeds to block 840 where it may identify how many 0's is in the same_digit_count. This count of the number of 0's is referred to simply as zero_count. In this example, the zero digit count is two, because there are two zeros in "02088". The method proceeds to decision block 905 of FIG. 9.

Figure 9:
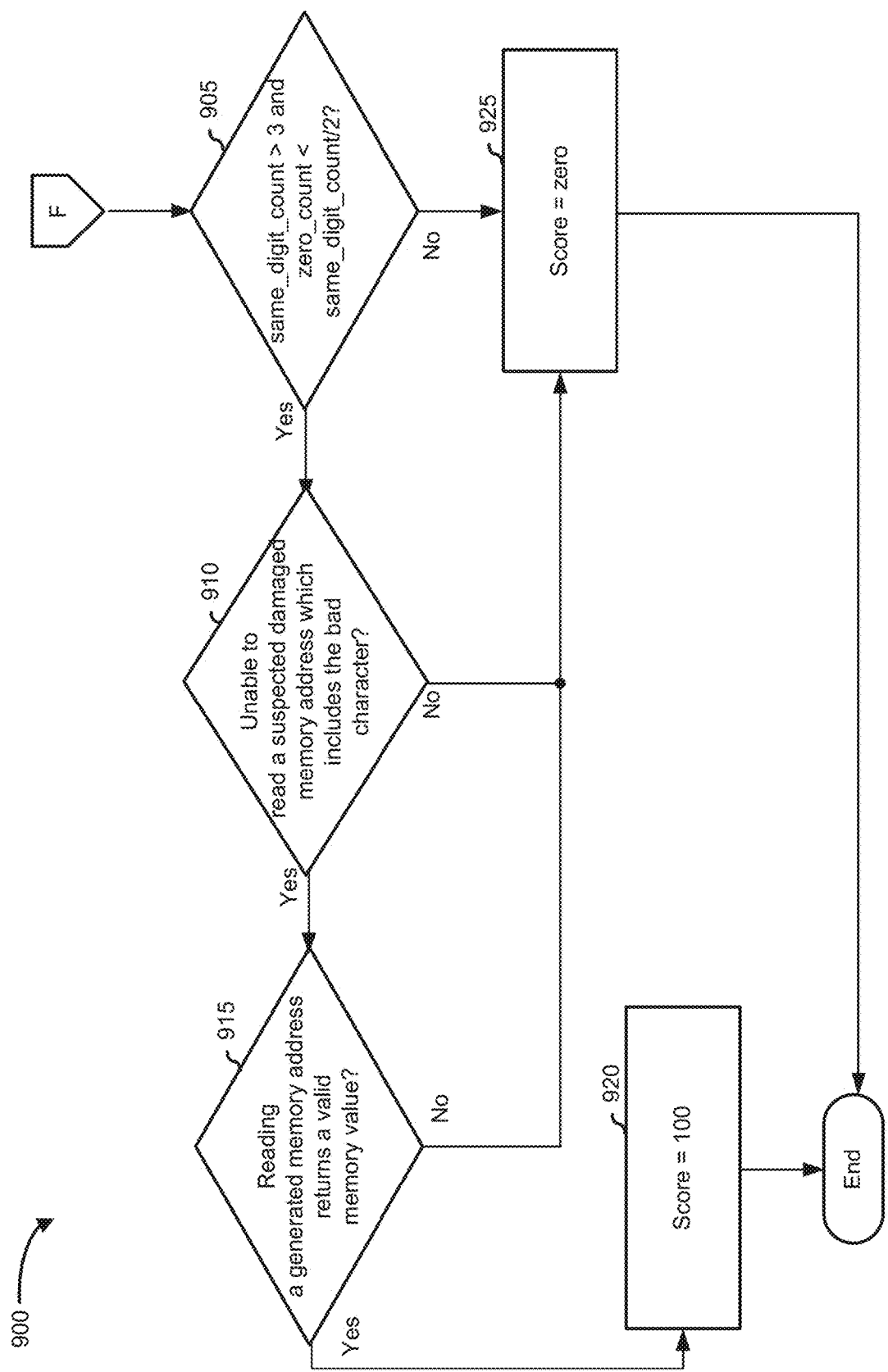
FIG. 9 is a flowchart illustrating a method for single-bit memory error detection, according to an embodiment of the present disclosure.

FIG. 9 shows a flowchart of a method 900 for single-bit error detection. Method 900 is a continuation of method 800 of FIG. 8. At method 900, the single-bit error detection engine may perform several checks to verify or confirm the single-bit error detected in method 800 of FIG. 8. If the verification passes, then the pair of memory addresses may get a score of 100. Otherwise, the pair of memory addresses may get a score of zero.

Method 900 typically starts at decision block 905 where the single-bit detection engine may determine whether the value of same_digit_count is greater than three and the value of zero_count is fewer than the value of same_digit_count divided by two. If the method determines that the value of same_digit_count is greater than three and the value of zero_count is fewer than the value of same_digit_count divided by two, then the "YES" branch is taken, and the method proceeds to decision block 910. If the single-bit detection engine determines that value of same_digit_count is not greater than three or the value of zero_count is not fewer than the value of same_digit_count divided by two, then the "NO" branch is taken, and the method proceeds to block 925. In this example continuing from method 800 of FIG. 8, the same_digit_count is five which is greater than three. The zero_count is equal to two which is fewer than five divided by two. Thus, it is true in both conditions, and the "YES" branch is taken and other checks may be performed.

In another example, in both memory addresses, the bad characters are followed by the same four characters "0001", then the same_digit count is equal to four and the zero_count is equal to three. The same_digit count of four is greater than three. However, the zero_count which is three is greater than four divided by two. Thus, the "NO" branch is taken and the score is set to zero. The decision block 905 is performed to reduce false positives.

At decision block 910, the single-bit detection engine determines whether it is unable to read a suspected damaged memory address using a debugger. The suspected damaged address is associated with the hexadecimal string with the bad character identified in method 800 of FIG. 8. If the debugger is unable to read the suspected damaged address, then the "YES" branch is taken, and the method proceeds to decision block 915. If the debugger can read the suspected damaged memory address, then the "NO" branch is taken, and the method proceeds to block 925.

At decision block 915, the single-bit detection engine may generate a memory address based on the suspected damaged memory address by flipping the bad bit. The single-bit detection engine may determine whether reading the generated memory address returns a valid memory value. If reading the generated memory address returns a valid memory value, then the "YES" branch is taken, and the method proceeds to block 920. This may confirm that the suspected damaged memory address has a single-bit error. If reading the generated memory address does not return a valid memory value, then the "NO" branch is taken, and the method proceeds to block 925. At block 920, the method sets the value of the score to one hundred. At block 925, the method sets the value of the score to zero. If the score is 100, then the single-bit error detection engine may have verified/confirmed that the suspected memory address is damaged and an RMA or QR code may be generated to authorize repair. If the score is zero, then the single-bit detection engine has not verified/confirmed that the suspected memory address is damaged. In this scenario, an RMA or QR code may not be generated. However, other processes may be initiated automatically or a technical support specialist may initiate the other processes to determine the issue.

Figure 10:
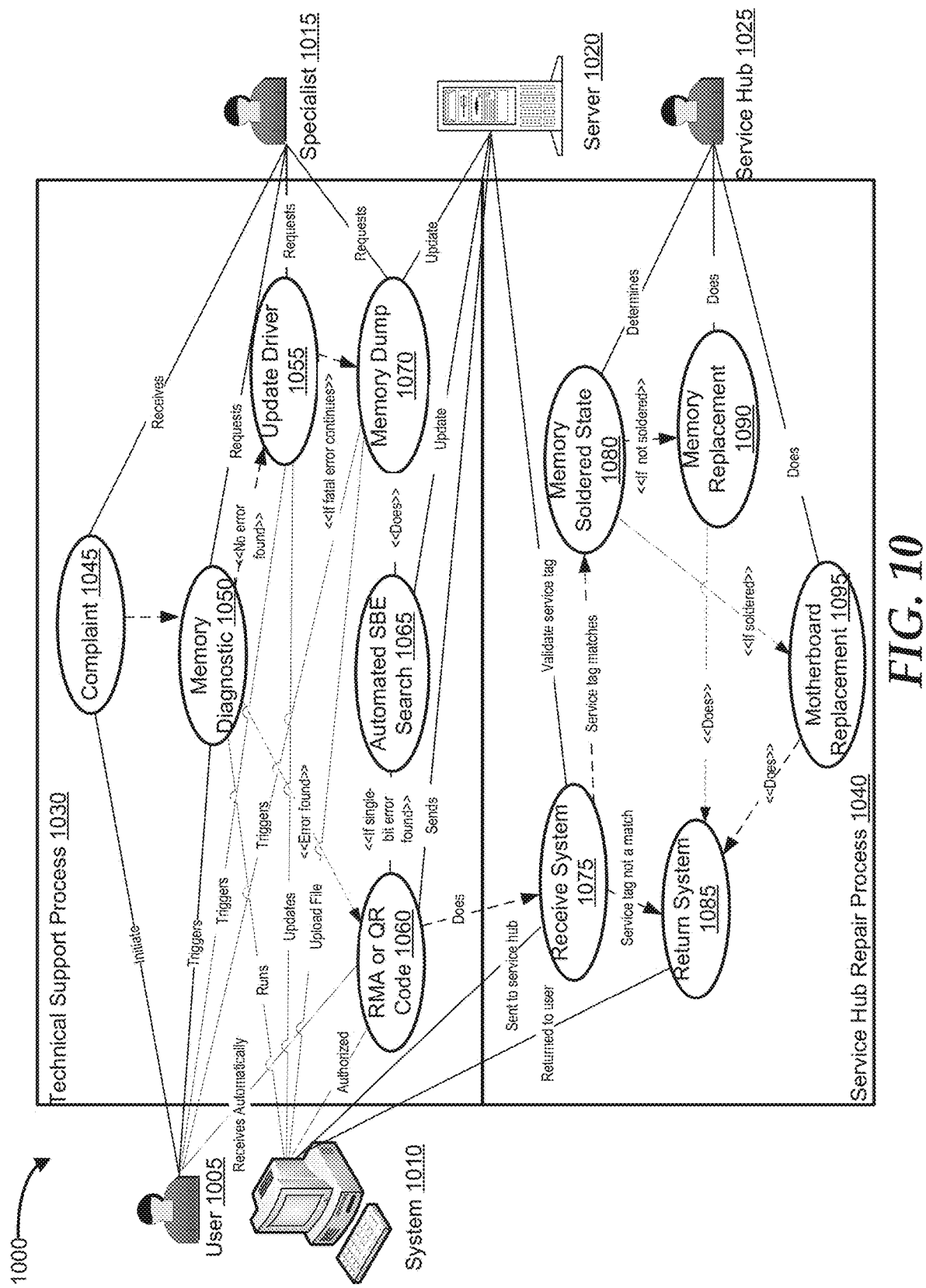
FIG. 10 is a diagram illustrating a process for providing support for an information handling system with a catastrophic or fatal failure, according to an embodiment of the present disclosure.

FIG. 10 is a diagram of process 1000 providing support for an information handling system with a catastrophic or fatal failure. Process 1000 includes a user 1005, a system 1010, a specialist 1015, a server 1020, and a service hub 1025. Process 1000 includes a technical support process 1030 which may be performed to determine an issue associated with system 1010 and perform an action accordingly. Process 1000 also includes a service hub repair process 1040 which may be performed to fix the issue. System 1010 may have had a catastrophic or fatal error more than once. Instead of sending user 1005 an RMA or QR code and changing a memory without proof of faulty memory, a technical support specialist, such as specialist 1015 may work with user 1005 to upload a full or a mini memory dump from system 1010 to server 1020. Server 1020 includes a software application, such as a single-bit detection engine, that may be automatically launched to analyze the memory dump file for a single-bit error upon receipt of the memory dump. If the analysis confirms that system 1010 has a single-bit error, then server 1020 may generate an RMA or a QR Code to authorize repair. Otherwise, if the analysis does not confirm that system 1010 has a single-bit error, and then the repair may not be authorized.

User 1005 may initiate a technical support process 1003 by filing complaint 1045 with specialist 1015 regarding system 1010. System 1010 may be a faulty information handling system. System 1010 may or may not include a memory with a single-bit error. Specialist 1015 may request a memory diagnostic 1050 and an update driver 1055 if no error is found during memory diagnostic 1050. If an error is found, specialist 1015 may also request a memory dump 1070 of system 1010. Accordingly, user 1005 may trigger memory diagnostic 1050, update driver 1055, and memory dump 1080 according to the request of specialist 1015.

If an error is detected in memory diagnostic 1050, then a repair authorization may be issued. For example, an RMA or a QR code 1060 may be generated and transmitted to user 1005. If the fatal or catastrophic failure continues after performing update driver 1055, then specialist 1015 may request that memory dump 1070 be performed. An automated single-bit error search 1065 may be performed on memory dump 1070 and RMA or QR code may be requested if a single-bit error is found during the search.

Specialist 1015 may request user 1005 to send system 1010 to service hub 1025 upon receipt of RMA or QR code 1060. Upon receipt of system 1010 at receive system 1075, server 1020 may validate a service tag of system 1010. If the service tag validation is successful, wherein server 1020 matches the service tag to the RMA or QR code 1060, then memory soldered state 1080 may be determined. If the service tag validation is unsuccessful, server 1020 may initiate a return system 1085 to return system 1010 to user 1005.

If service hub 1025 determines that the memory is not soldered, service hub 1025 may perform a memory replacement 1090 and then does return system 1085 to return system 1010 to user 1005. If the service hub determines that memory is soldered, then service hub 1025 may perform a motherboard replacement 1095 before performing a return system 1085 to return system 1010 to user 1005.

Although FIG. 3, FIG. 4, FIG. 5, FIG. 6, FIG. 7, FIG. 8, and FIG. 9 show example blocks of method 300, method 400, method 500, method 600, method 700, method 800, and method 900 in some implementation, method 300, method 400, method 500, method 600, method 700, method 800, and method 900 may include additional blocks, fewer blocks, different blocks, or differently arranged blocks than those depicted in FIG. 3, FIG. 4, FIG. 5, FIG. 6, FIG. 7, FIG. 8, and FIG. 9. Those skilled in the art will understand that the principles presented herein may be implemented in any suitably arranged processing system. Additionally, or alternatively, two or more of the blocks of method 300, method 400, method 500, method 600, method 700, method 800, and method 900 may be performed in parallel. For example, block 305, block 310, and block 315 of method 300 may be performed in parallel. In addition, method 300, method 400, method 500, method 600, method 700, method 800, and method 900 may be performed by one or more components of environment 200 of FIG. 2. However, while embodiments of the present disclosure are described in terms of environment 200 of FIG. 2, it should be recognized that other systems may be utilized to perform the described method. One of skill in the art will appreciate that this flowchart explains a typical example, which can be extended to advanced applications or services in practice.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
obtaining, by a processor, data associated with a failure of an information handling system;
analyzing the data received from the information handling system, including:
evaluating memory addresses associated with bug check parameters included in the data to determine whether one of the memory addresses has a single-bit error;
determining whether bits from a $63^{rd}$ bit to a $48^{th}$ bit in binary form of a first memory address are all ones;
modifying the first memory address with the single-bit error to generate a second memory address, wherein the first memory address is one of the memory addresses being evaluated;
determining whether the second memory address is mapped to a page table; and
in response to determining that the second memory address is mapped to the page table, generating a return to manufacturer authorization for the information handling system.

2. The method of claim 1, further comprising evaluating other memory values associated with central processing unit context registers and stack memory included in the data.

3. The method of claim 1, wherein the data obtained includes a memory dump.

4. The method of claim 1, wherein the modifying of the first memory address includes toggling a bit with the single-bit error.

5. The method of claim 1, further comprising each pair of the memory addresses included in the data, determining whether the pair of the memory addresses are same.

6. The method of claim 1, further comprising determining whether the data is a memory address.

7. The method of claim 1, wherein the modifying of the first memory address is performed by flipping a zero bit that is one of bits from a $63^{rd}$ bit to a $48^{th}$ bit of the first memory address.

8. The method of claim 1, further comprising generating a quick response code.

9. The method of claim 1, further comprising in response to determining that a pair of the memory addresses are not same, converting the memory addresses into hexadecimal strings.

10. The method of claim 9, further comprising comparing binary values of the hexadecimal strings to determine if there is a single-bit difference between the hexadecimal strings.

11. The method of claim 10, further comprising if the single-bit difference is determined, then determining a score for the hexadecimal strings according to a hexadecimal nibble value.

12. An information handling system, comprising:
a processor; and
a memory storing instructions that when executed cause the processor to perform operations including:
obtaining data associated with a failure of the information handling system;
analyzing the data received from the information handling system, including:
evaluating memory addresses associated with bug check parameters included in the data associated with the failure to determine whether one of the memory addresses has a single-bit error;
modifying a first memory address with the single-bit error to generate a second memory address, wherein the first memory address is one of the memory addresses being evaluated;
modifying the second memory address, wherein the modifying of the second memory address is performed by flipping one of bits from a $63^{rd}$ bit to a $48^{th}$ bit of the first memory address that is a zero;
determining whether the second memory address is mapped to a page table; and
in response to determining that the second memory address is mapped to the page table, authorizing a repair of the information handling system.

13. The information handling system of claim 12, wherein the data obtained includes a memory dump.

14. The information handling system of claim 12, wherein the operations further comprise determining whether the memory addresses are same for each pair of the memory addresses included in the data.

15. The information handling system of claim 12, wherein the operations comprise determining whether the data is a memory address.

16. The information handling system of claim 12, wherein the operations further comprise confirming the single-bit error in response to successfully reading from the second memory address using a debugger.

17. A non-transitory computer-readable medium to store instructions that are executable to perform operations comprising:
obtaining data associated with a failure of an information handling system;
analyzing the data received from the information handling system, including:
evaluating memory addresses associated with bug check parameters included in the data associated with the failure to determine whether one of the memory addresses has a single-bit error;
modifying a first memory address with the single-bit error to generate a second memory address, wherein the first memory address is one of the memory addresses being evaluated;
if the second memory address is mapped to a page table, then determining that a repair of the information handling system is needed; and
if the second memory address is not mapped to the page table, then determining that the repair of the information handling system is not needed.

18. The non-transitory computer-readable medium of claim 17, wherein the operations further comprise converting the memory addresses into hexadecimal strings and comparing the hexadecimal strings.

19. The non-transitory computer-readable medium of claim 18, wherein the operations further comprise comparing binary values of the hexadecimal strings to determine if there is a single-bit difference between the hexadecimal strings.

20. The non-transitory computer-readable medium of claim 19, wherein the operations further comprise if the single-bit difference is determined, then determining a score for the hexadecimal strings according to a hexadecimal nibble value.

* * * * *